Aug. 22, 1950 V. A. DANIELSON ET AL 2,519,745
GARDEN TRACTOR
Filed Feb. 24, 1947 2 Sheets-Sheet 2
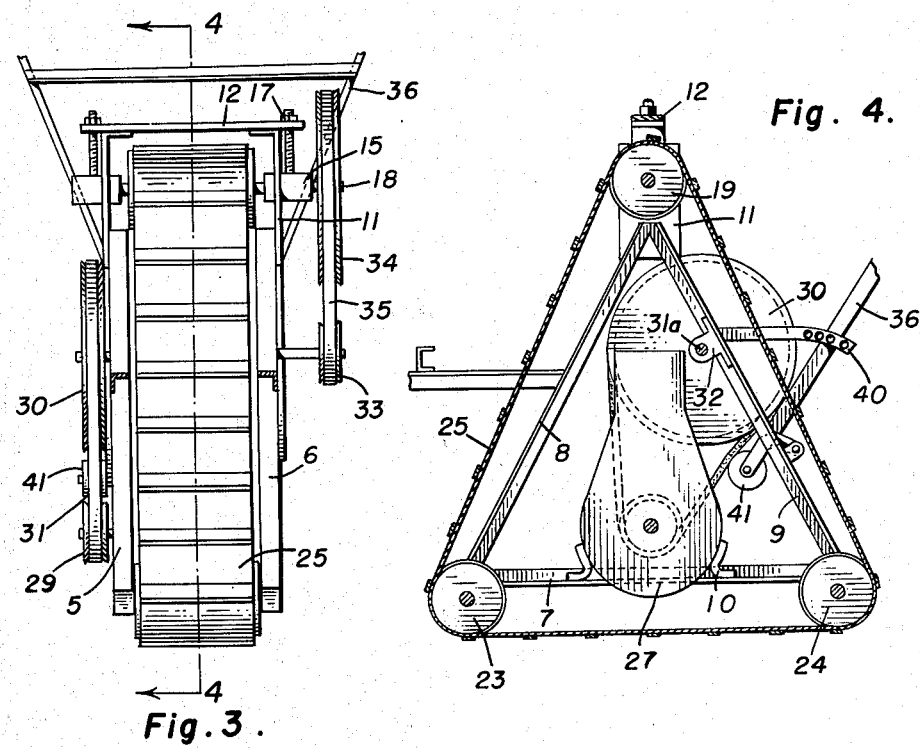
Fig. 3.
Fig. 4.
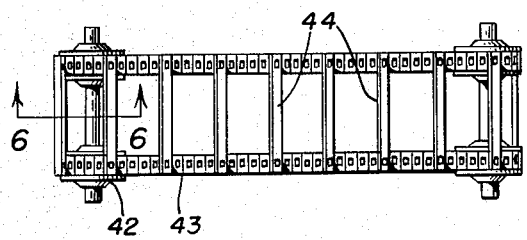
Fig. 5.
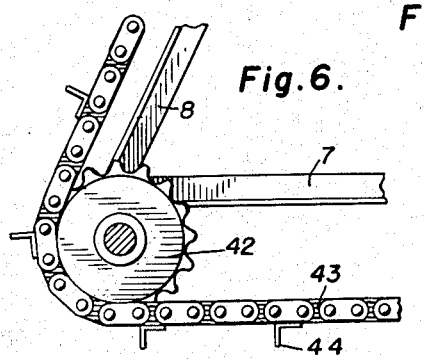
Fig. 6.
Inventors
Vincent A. Danielson
Leo B. Neasham
By Clarence A. O'Brien
and Harvey B. Jacobson
Attorneys Patented Aug. 22, 1950

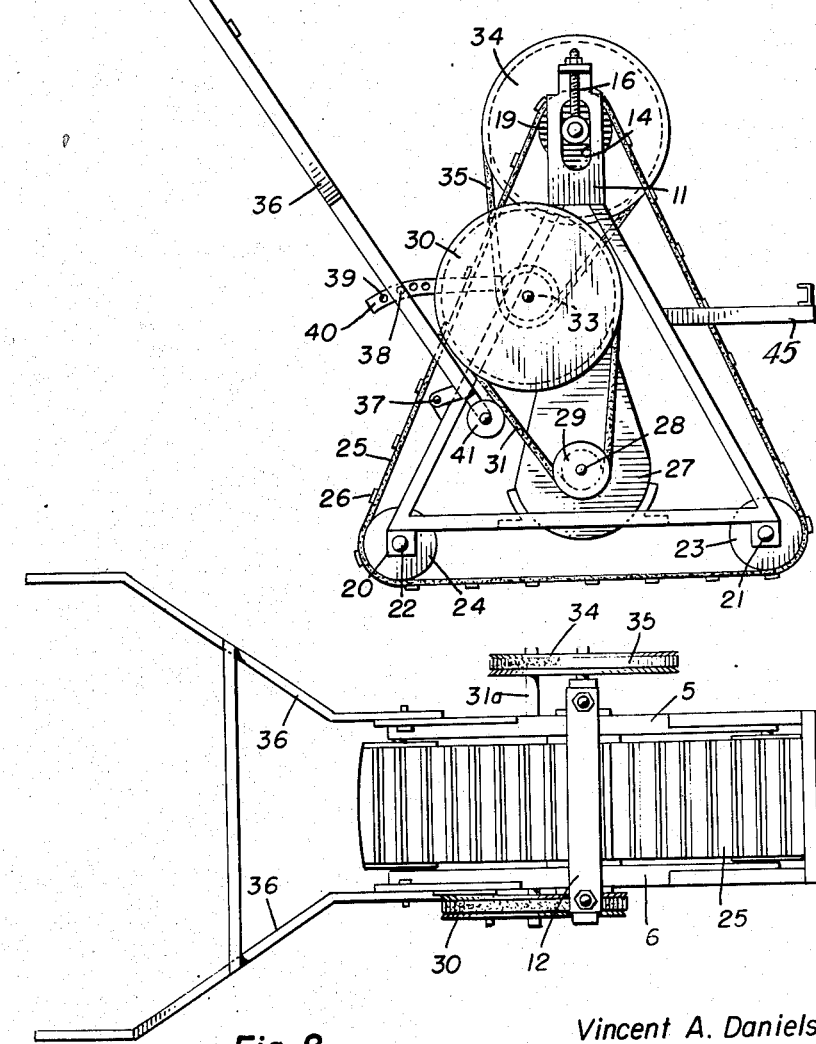

2,519,745

UNITED STATES PATENT OFFICE 2,519,745

GARDEN TRACTOR

Vincent A. Danielson, Fort Dodge, and Leo B. Neasham, Nevada, Iowa

Application February 24, 1947, Serial No. 730,302

1 Claim. (Cl. 180—19)

The present invention relates to new and useful improvements in tractors and more particularly to a walking tractor controlled by a person walking behind the tractor.

More specifically, this invention embodies the provision of a walking tractor of this character in which the traction means is provided by a caterpillar tread.

A further object of the invention is to provide a walking caterpillar tractor of light weight construction and including handles extending rearwardly therefrom to guide the tractor in its movement over the ground.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view;

Figure 3 is a front elevational view;

Figure 4 is a vertical sectional view taken on the line 4—4 of Figure 3;

Figure 5 is a bottom plan view of a modified tread construction, and

Figure 6 is a fragmentary sectional view taken on the line 6—6 of Figure 5.

Referring now to the drawings in detail, and first with respect to the form of the invention illustrated in Figures 1 to 4 inclusive, the numerals 5 and 6 designate a pair of upstanding triangular shaped frame members preferably of angle iron construction and each including a lower horizontal frame member 7, and upwardly converging frame members 8 and 9, the ends of the frame members being welded or otherwise suitably secured to each other. The frame members 5 and 6 are connected to each other in spaced parallel relation by means of transverse frame members 10 extending between the lower horizontal frame member 7.

Plates 11 are welded or otherwise suitably secured to the upper ends of the frame members 8 and 9 and extend upwardly therefrom and with their upper ends connected to each other by an upper transverse frame member 12.

The plates 11 at each side of the frame are provided with vertically elongated openings 14 in which bearings 15 are positioned for vertical adjustment by upstanding adjusting screws 16 threaded in the outwardly projecting ends of the upper cross member 12 and secured in vertically adjusted position by a nut 17.

A shaft 18 is journaled in the bearings 15 and to the central portion of which is suitably secured a crown pulley 19.

Bearings 20 are welded or otherwise suitably secured under the front and rear corners of the frames 5 and 6 and in which front and rear transverse shafts 21 and 22 are journaled on the central portion of which are rotatably mounted front and rear idler crown pulleys 23 and 24.

An endless caterpillar tread 25 is trained over the pulleys 19, 23 and 24, the outer surface of the tread being provided with transversely extending cleats 26.

A conventional power plant which may be in the form of an internal combustion engine 27 is supported between the frame members 5 and 6 on the transverse frame members 10, the motor including a crank shaft 28 to which a pulley 29 is secured, and which drives a pulley 30 of increased diameter by means of a belt 31. The pulley 30 is keyed or otherwise suitably secured to a transversely extending shaft 31a journaled in bearing brackets 32 secured to the upper portion of the frame member 9, the pulley 30 being secured to one end of said shaft while a pulley 33 of reduced diameter is secured to the upper end of the shaft 31a.

The pulley 33 drives a pulley 34 of greater diameter by means of a belt 35, the pulley 34 being secured to one end of the shaft 18 to thus drive the tread 25.

A pair of upwardly and rearwardly inclined handles 36 are pivoted adjacent their lower ends on pins 37 carried by the lower portion of the frame member 9, the handles being secured in forwardly and rearwardly swingably adjusted positions by means of a pin 38 carried by one of the handles and selectively received in openings 39 in an arm 40 extending rearwardly from one of the frame members 9. On the lower end of one of the handles 36 is journaled a belt tightening roller 41 movable into and out of engagement with the belt 31 to thus tighten said belt and effect the drive between the pulleys 29 and 30.

The handles 36 steer the tractor during its forward movement over the ground and at the same time and by removing pin 38 may also swing roller 41 into and out of belt tightening engagement with belt 31 to control the driving of the tractor, or the pin 38 may hold the handle stationary with the roller 31 either in or out of driving position.

In Figures 5 and 6 I have shown a modified construction of the tread and which includes sprockets 42 secured to the shafts at the respective corners of the frame and with which chains 43 are engaged, the chains having cleats 44 connected thereto.

A coupling bar 45 is suitably attached to the frame for interchangeably projecting forwardly or rearwardly from the frame whereby various farm implements may be attached to the tractor.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What we claim is:

A walking tractor comprising a frame composed of a pair of upstanding spaced parallel triangular-shaped frame members and including horizontal lower portions, transverse members rigidly connecting the triangular frame members to each other, rotary members journaled at the lower front and rear corners of the frame, an upper rotary member journaled at the upper corner of the frame, an endless flexible tread mounted to travel on said rotary members, a power plant mounted on the lower portion of said frame members, flexible drive means between the power plant and the upper rotary member, and an adjustable bearing for said upper rotary member for simultaneously tightening the tread and the drive means.

VINCENT A. DANIELSON.
LEO B. NEASHAM.

REFERENCES CITED

The following references are of record in the file of this patent:

UNITED STATES PATENTS

| Number | Name | Date |
| --- | --- | --- |
| 1,233,712 | Schneider | July 17, 1917 |
| 1,722,531 | Matter | July 30, 1929 |
| 2,046,560 | Johnson et al. | July 7, 1936 |
| 2,239,122 | Stokes | Apr. 22, 1941 |
| 2,367,466 | Loy | Jan. 16, 1945 |
| 2,393,309 | Cochran | Jan. 22, 1946 |
| 2,453,819 | Smith | Nov. 16, 1948 |